United States Patent [19]

Ibe et al.

[11] Patent Number: 5,398,268
[45] Date of Patent: Mar. 14, 1995

[54] NUCLEAR POWER PLANT HAVING A WATER CHEMISTRY CONTROL SYSTEM FOR A PRIMARY COOLING SYSTEM THEREOF AND AN OPERATION METHOD THEREOF

[75] Inventors: Hidefumi Ibe, Katsuta; Masanori Takahashi, Mito; Yasuko Aoki, Hitachi; Yamato Asakura, Katsuta; Makoto Nagase, Hitachi; Noriyuki Ohnaka, Katsuta; Masanori Sakai, Hitachi; Takashi Saito, Katsuta; Katsumi Ohsumi, Hitachi; Kazuhiko Akamine, Katsuta; Makoto Hayashi, Hitachi; Kiyotomo Nakata, Katsuta, all of Japan

[73] Assignee: Hitachi, Ltd., Tokyo, Japan

[21] Appl. No.: 960,847

[22] Filed: Oct. 14, 1992

[30] Foreign Application Priority Data

Oct. 14, 1991 [JP] Japan .................. 3-264512

[51] Int. Cl.6 .................................. G21C 9/00
[52] U.S. Cl. ........................... 376/305; 376/306; 376/245
[58] Field of Search ............. 376/305, 306, 245, 310

[56] References Cited

U.S. PATENT DOCUMENTS 5,005,142  4/1991  Lipchak ................. 376/245
5,110,537  5/1992  Miura et al. ............ 376/305
5,126,101  6/1992  Nakayama et al. ....... 376/310

FOREIGN PATENT DOCUMENTS 61-86688  5/1986  Japan .
64-53146  3/1989  Japan .
3-146900  6/1991  Japan .
4-93698   3/1992  Japan .

OTHER PUBLICATIONS

Ser. No. 07/824,399 filed Jan. 23, 1992 "Plant Diagnosis Apparatus and Method".

*Primary Examiner*—Donald P. Walsh
*Assistant Examiner*—Frederick H. Voss
*Attorney, Agent, or Firm*—Antonelli, Terry, Stout & Kraus

[57] ABSTRACT

A water chemistry factor which is specific to a specific portion of a primary cooling system and universal is decided to be a standard target. The concentration of an agent for mitigating corrosion damage of structural material of the primary cooling system is controlled so that the target will be in a desirable range. All sensor groups provided in the primary cooling system are separated into sensor groups in different lines, of which a specific sensor group are connected to an arithmetic unit and a data base and are for always monitoring a plant process. For example, concentration distribution agreed with measured value oxidation component in the reactor water at the measurement points is selected from the data base, and it is used to estimate the standard target.

23 Claims, 14 Drawing Sheets

NUCLEAR POWER PLANT HAVING A WATER CHEMISTRY CONTROL SYSTEM FOR A PRIMARY COOLING SYSTEM THEREOF AND AN OPERATION METHOD THEREOF

BACKGROUND OF THE INVENTION

The present invention relates to a nuclear power plant which has a water chemistry control system for a primary cooling system thereof and, in particular, to a water chemistry control system of a boiling water reactor primary cooling system for preventing corrosion damage of structural material used therein to make its life long.

The invention can be applied to industrial fields in which water chemistry control is necessary, such as various power plants, chemical plants and so on.

In a water chemistry control system, first of all, water chemistry is evaluated, and then an agent for mitigating corrosion damage is injected into the water to be controlled according to the evaluation result.

1. Conventional reactor core water chemistry evaluation technique:

(a) By measurement of concentration of dissolved oxygens, hydrogens, hydrogen peroxides;

In a nuclear reactor primary cooling system, core water is subjected to strong irradiation such as neutrons, gamma rays, so that radicals as well as corrosive oxygens and hydrogen peroxides are formed. Hitherto, after the primary cooling water was cooled once, the concentration of dissolved oxygens, hydrogens and hydrogen peroxides were measured by a conventional measuring device. In this method, the hydrogen peroxides are decomposed during the cooling process and balance between components changes, so that there was a problem that correct water chemistry could not be measured even if the primary cooling system was limited to recirculation pipings. At present there is no measuring device which can be used under an environment of high temperature and high radiation exposure.

(b) By an electro-chemical potential (ECP) meter.

SCC (stress corrosion cracking) sensibility of material is correlated to ECP as shown in FIG. 2. There are many attempts in which a corrosion environment is directly monitored by submerging an ECP meter into reactor water. FIG. 3 shows results of direct measurement in a US Duan Arnold furnace. It is noted from the results that a water chemistry environment changes remarkably according to measured portions of a nuclear reactor primary cooling system.

(c) By monitoring of cracking propagation:

A method is being widely taken in which test pieces cracked in advance are submerged in reactor water, and then the cracking propagation rate is electrically measured. A typical example of a device for this method is a DCB (Double Cantilever Beam) sensor which is shown in JP A 4-93698 (1992). A sensor of type shown in JP A 3-146900 (1991) also is proposed.

Examples of outputs from the DCB sensors provided in a real core and a recirculation line are shown in FIG. 4. It is noted that change in outputs from the DCB sensor disposed in the core is larger than that in outputs from the DCB sensor disposed in the recirculation line, which means that a corrosion environment in the core is severe.

(d) By a high temperature electric conductivity meter:

A method, in which this meter or sensor is used, is to cancel electrode surface resistance by using three electrodes in an alternate current method and measure only solution resistance. A typical example is shown in JP A 1-53146 (1989).

(e) By a chemical state measuring device of radioactive nitrogen 13 ($^{13}N$) in main steam:

The device can measure the concentration of radioactive nitrogen 13 in main steam condensate on each of anions, cations and neutral components. The device shown in JP A 4-93698 (1992) is best.

2. Reactor water chemistry mitigation technique:

Stress corrosion cracking (SCC) of nuclear reactor structural material occurs only when three factors of the SCC, that is to say, material, water chemistry and stress are unfavorable. Therefore, SCC occurrence can be prevented by keeping the dissolved oxygens in the reactor water in a low level. On this ground, hydrogen injection into the reactor water is tried in many boiling water reactors recently. However, in this method, a radiation dose rate in a main steam line increases rapidly when it becomes over a threshold, as shown in FIG. 6, and the concentration of oxygens and hydrogen peroxides has a large variation by plant design, operational conditions and existence of impurities in the water as shown in FIG. 6, so that simple estimated of the water chemistry is difficult.

It is possible to calculate, with some extent of preciseness, concentration distribution of water decomposition products according to a hydrogen injection amount. In fact, a control method in which a suitable injection amount is decided for each plant by using calculation codes, and fitting calculated parameters to accord them with measured values is proposed in JP A 61-86688 (1986). The number of parameters is huge, and huge work is necessary for fitting. Further, it is not always assured that its solution can be obtained. Still further, the concentration of impurities in the reactor water is not fixed during operation. For the above reasons, the control method is not necessarily practical.

As mentioned above, new sensors for water chemistry evaluation are being developed one after another, and it is forecast that the kinds and the numbers of sensors increase in future. Evaluation preciseness of the reactor water chemistry is improved, however, it is impossible at present and also in future to arrange sensors for water chemistry measurement all over the region of the primary cooling system, and it is forecast that the condition that a part of area to be evaluated must depend on estimated will continue. As pieces of information increase, it becomes difficult how to use the information. It is not fixed even at present how to use what sensor at what position. Further, it is forecasted that various changes in a water chemistry standard will occur as its study progresses. Namely, water chemistry control of nuclear reactors always has fate such that it must be optimized using incomplete information and according to a temporary standard. It is not economical to reproduce a hardware at each time when new sensing technique and standard are established, so that a flexible hardware for totally judging information and determining control parameters and quantity of water chemistry is required. This kind of construction which is easily receivable of various software for arithmetic operation and processing concerning each sensed information is required.

SUMMARY OF THE INVENTION

An object of the invention is to secure a method for estimating and evaluating water chemistry in a reactor core, in a primary cooling system and therearound with high preciseness, and to provide a sensor system which is necessary to enable suitable water chemistry control on the basis of the estimated evaluation result.

An evaluation standard for water chemistry can not established by a single sensor for sensing water chemistry because sensors used for evaluation of the reactor water chemistry have various error factors. An increase of kinds of sensors does not lead to substantial solution due to the following error factors, and a real solution is required.

1) Error factors of corrosion environment evaluation in a reactor primary cooling system:

In a boiling water reactor primary cooling system as shown in FIG. 7, cooling water is exposed to a strong irradiation field in the core, so that water is decomposed to form various kinds of molecules, ions and radicals such as $H_2$, $O_2$, $H_2O_2$, $HO_2$, $HO_2$ ions, H, OH, H ions, OH ions, hydration electrons, etc., which influence on corrosion of material used therein. Most of gaseous molecules such as hydrogens and oxygens of these water decomposition products transfer in a boiling channel of the core 9 in steam phase and are produced or recombined according to a dose rate at each portion of the reactor primary cooling system, so that distribution of the concentration of hydrogens or hydrogen peroxides is formed in the primary cooling system.

Recently, in order to improve a corrosion environment by controlling reactor water chemistry, a method is taken in which hydrogens of reducing agent are injected to reduce the concentration of dissolved oxygens. However, concentration distribution is formed in the primary cooling system even during injection of hydrogens for the above-mentioned reasons. Products by radiolysis of water can be evaluated by quantatively analyzing production of each component, chemical reaction between the components, and mass transfer of gaseous components in the boiling channel of the core. In FIG. 8, the calculation results are illustrated in which a water chemistry environment at a core inlet, a by-pass channel outlet or exit and a boiling channel of the core is functions of the concentration of hydrogens in the feed water. From the figure it is noted that a main decomposition product of water is hydrogen peroxide, and judging from the hydrogen peroxide concentration or effective oxygen concentration which is defined here by $(O_2+H_2O_2/2=O_2^*)$, most severe condition is at the boiling channel inlet, next at the by-pass channel outlet and a core inlet in turn except for when hydrogens added are a little. The above calculation results qualitatively agree with ECP values in the core shown in FIG. 3. From environmental viewpoint simply, if an environment at the boiling channel can be reduced in the effective oxygen concentration to a preferable level, a favorable environment can be secured at any other position in the primary cooling system. However, practically, almost all of injected hydrogens are released into the air at the boiling channel, so that it is difficult to sufficiently suppress the release of the hydrogens. On the other hand, the boiling channel has only fuel rods and fuel assemblies which are easily exchangeable and are not of structural material, so that countermeasure is not necessarily required. Further, an upper lattice plate 12 and a lower lattice plate 11 are included in the by-pass channel, and the upper lattice plate 11 can not be exchanged. Therefore, the most practically important evaluation point is at the core inlet 11. A shroud 14 over an upper plenum 13 supports an upper construction of the core, so that environment evaluation on this portion of the core is important.

2) Error factor of ECP

It is known that IGSCC (inter granular SCC) can be suppressed by controlling ECP of nuclear reactor structural material such as SUS 304 to be less than a certain value of base potential. However, recently, it is pointed out that the boundary potential changes on the basis of coexisting impurity ions. Therefore, it is necessary to take, in advance, account of that correlation between the ECP and IGSCC changes according to mechanical conditions such as water chemistry, material, water flow, etc. It is necessary to establish a system in which new knowledge can be taken in the water chemistry standard and its value is decided by taking in a plurality of measured values.

3) Correlation between conductivity and cracking propagation rate of material:

In General, crack propagation rate of material is correlated by the concentration and conductivity of acid components in water and conductivity. However, according to recent experimental results, the crack propagation rate changes remarkably according to kinds of additives as shown in FIG. 9, and there is an additive such as nitric acid which presents a little slow crack propagation rate than pure water. Further, according to an experiment conducted by the inventors, under an environment of Gamma ray irradiation, it is known that the crack propagation rate changes remarkably depending on kinds of ions in water even when the water has the same conductivity and the dissolved oxygen concentration, as shown in FIG. 10.

As mentioned above, irrespective of inherent error factors, new water chemistry sensors have been developed, whereby reliability of water chemistry evaluation is raised. However, on the contrary, even a fundamental idea how to control the water chemistry, using information from the sensors is not fixedly established although it is very important and inevitable to establish the technique. Problem is in that a fundamental idea how to direct characteristics of an individual sensor to the control has not been proposed.

A principal construction of the invention is explained hereunder, referring to FIG. 1.

In FIG. 1, sensor groups 1, 2 are arranged in different locations or portions of a primary cooling system such as a feed water line, a recirculation line, a reactor pressure vessel, main steam lines, etc. Each of the sensor groups 1,2 is individually connected to a recording, alarm generation device 3, whereby recording and alarm generation can be effected. The sensor group 1 which is used for always monitoring is connected to an arithmetic unit processing unit 6 through a switch 4, whereby it is confirmed that a monitored value is within a proper range through injection of an agent for mitigating corrosion damage by an injector 7. The other sensor groups 2 can be used stand alone or by being connected to the arithmetic unit 6 with switches 5 being closed, when necessary.

First of all, when any abnormality appears in the monitored values by the sensor group 1, the abnormality is analyzed using a data base 7, etc. When the result reaches to the conclusion that the concentration of the agent is desirable to be changed, a portion in which the largest change in water chemistry will occur when an injection amount of the agent is changed or a portion in which conditions on corrosion damage will be most severe is estimated, and limits for increasing and decreasing the agent are decided.

When the injection amount of the agent is changed according to the decision of the increment or the decrement, the sensor group at the portion estimated above are connected to the arithmetic unit 6, and the water chemistry is controlled while monitoring so that a measured value or estimated value of a standard water chemistry factor will be a standard value.

According to this water chemistry control system, even a new sensor and a new water chemistry standard can be applied properly and promptly to the system, and improvement of preciseness in evaluation and control as a whole is possible while compensating errors inherent in individual sensor.

A target of the water chemistry control is a standard water quantity at a standard place which will be called as a standard target here. The standard quantity is a measurable quantity or an immeasurable quantity obtained through calculation from the measurable quantity. For the standard target, a threshold value is set for judging whether or not any countermeasures are required. It is desirable for the standard target to select physical or chemical property values which are universal and do not depend on a specific sensor, whereby it becomes unnecessary to change the standard each time a new sensor is developed and all the sensors can contribute to improvement of evaluation preciseness of the standard target. For monitored quantities other than the standard target, a threshold value is provided for judging whether or not monitoring should be strengthened. The immeasurable standard target is estimated on the basis of outputs from a sensor group necessary to estimate.

By using a sensor group of kind and position by which evaluation errors to a predetermined standard target become minimum as a continual monitoring sensor group for always monitoring, and by evaluating quantatively the standard target, outputs of various sensors each of which has many error factors are synthesized or totalized, and water chemistry control of high reliability can be effected.

DETAILED DESCRIPTION OF THE EMBODIMENTS (A) In case of water chemistry control on the basis of measured values:

When a standard target is measurable and a measured value has a high reliability, at least a sensor group as measure the standard target is plant process monitors for always monitoring (a standard sensor group), and the other sensor group or groups are used for evaluation of reliability of the measured value of the standard target. When reliability is low even if it is possible to measure, the standard sensor group is used for backup. A sensor group including sensors of high reliability the outputs of which are changeable proportionally to change in the standard target becomes a plant process sensor group for fixedly monitoring a plant process.

Figure 1:
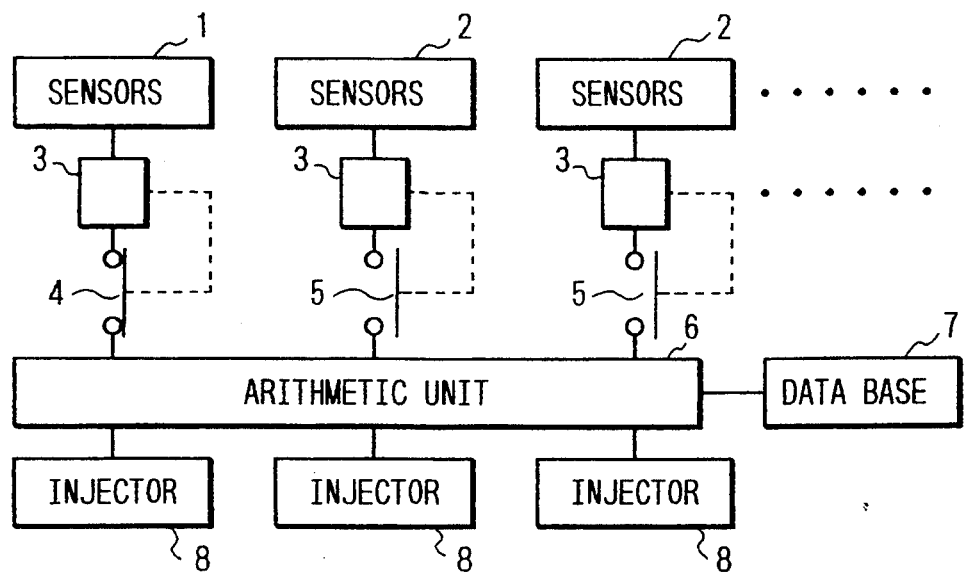
FIG. 1 is a schematic diagram illustrating a water chemistry control according to the invention.
Figure 2:
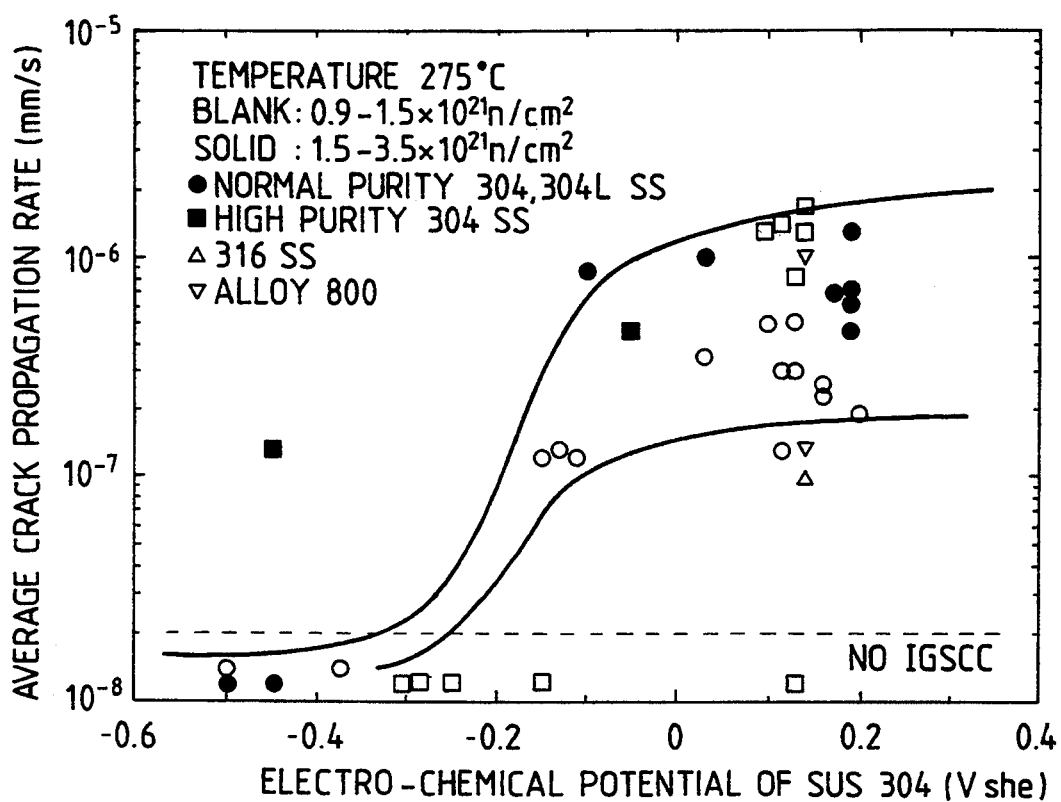
FIG. 2 is a diagram showing correlation between SCC sensibility of material and elctro-chemical potential.
Figure 3:
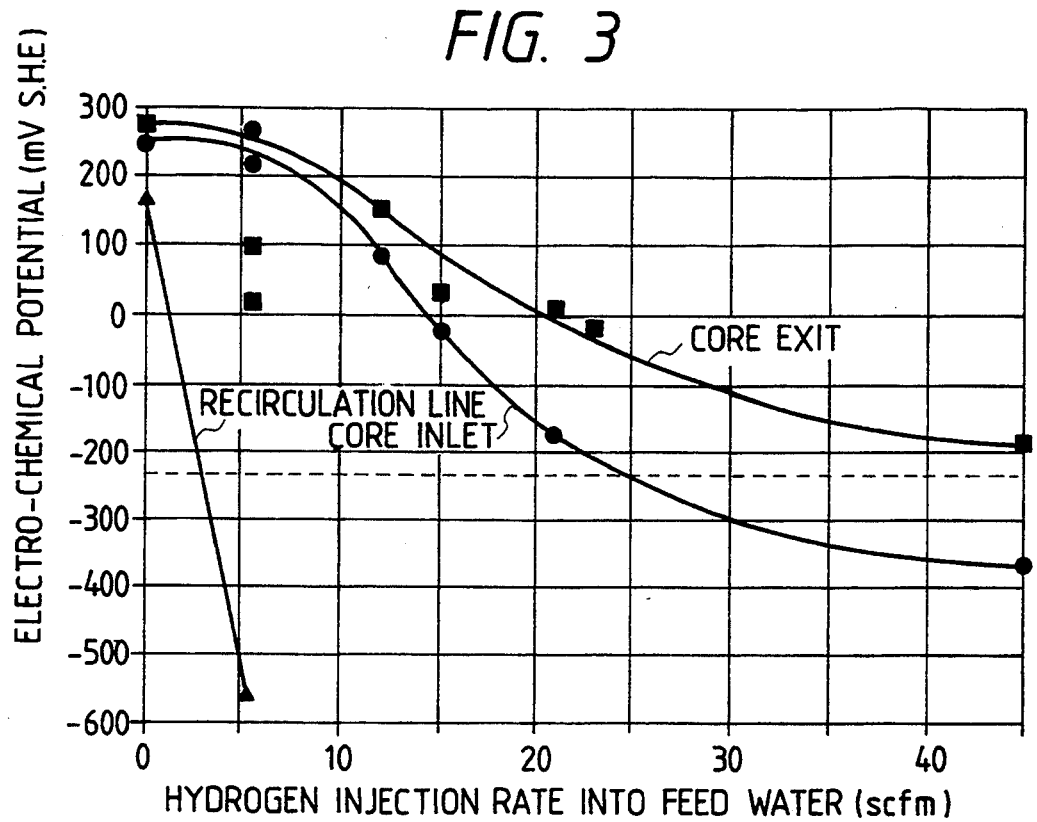
FIG. 3 is a diagram showing measurement results of EPC in a primary system in US Duan Arnold reactor.
Figure 4:
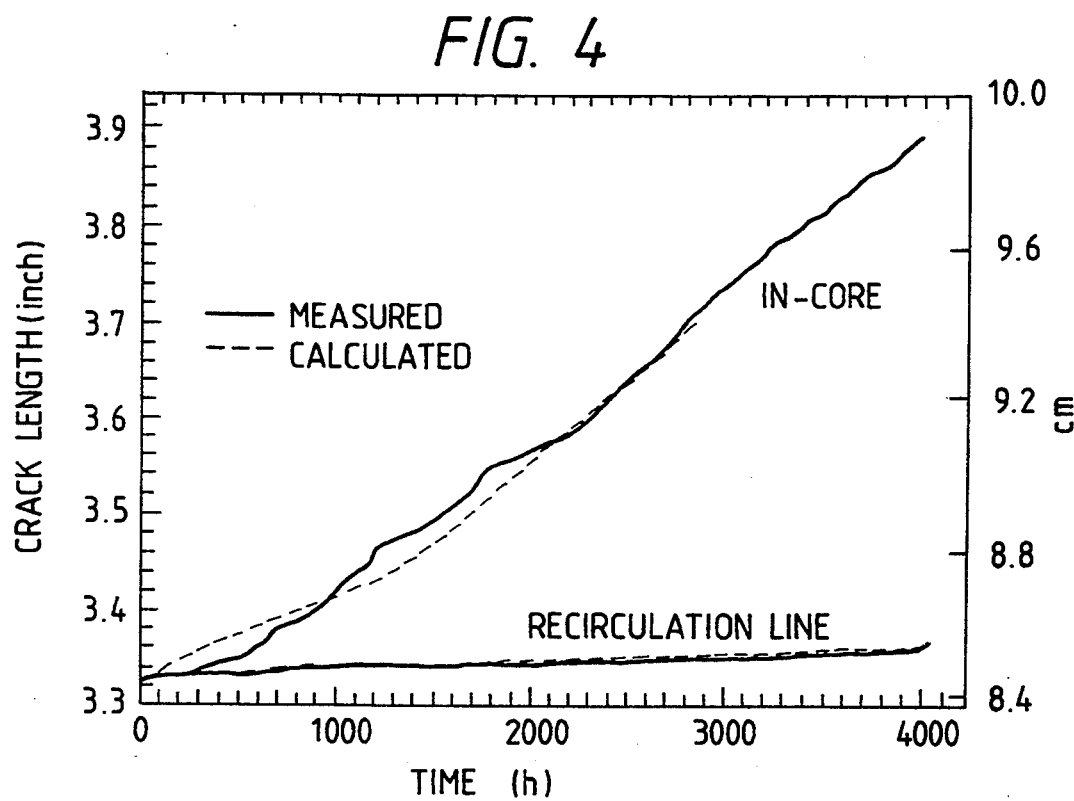
FIG. 4 is a diagram showing measurement results of DCB outputs in US Nine Mile - 1 reactor.
Figure 5:
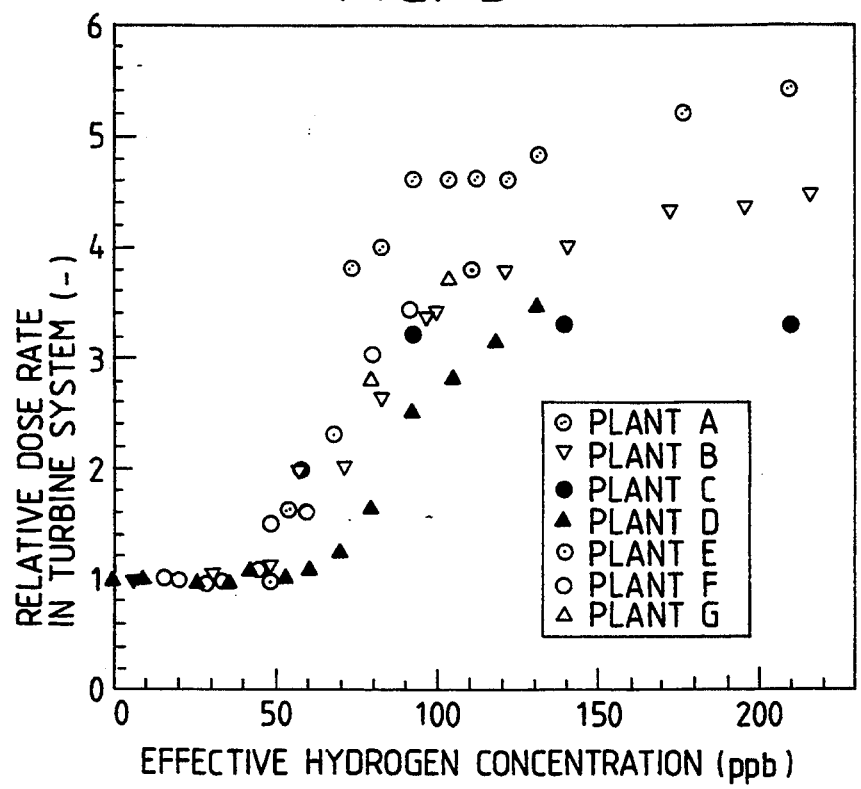
FIG. 5 is a diagram showing change in dose rate in a main steam line at a time of injection of hydrogens.
Figure 7:
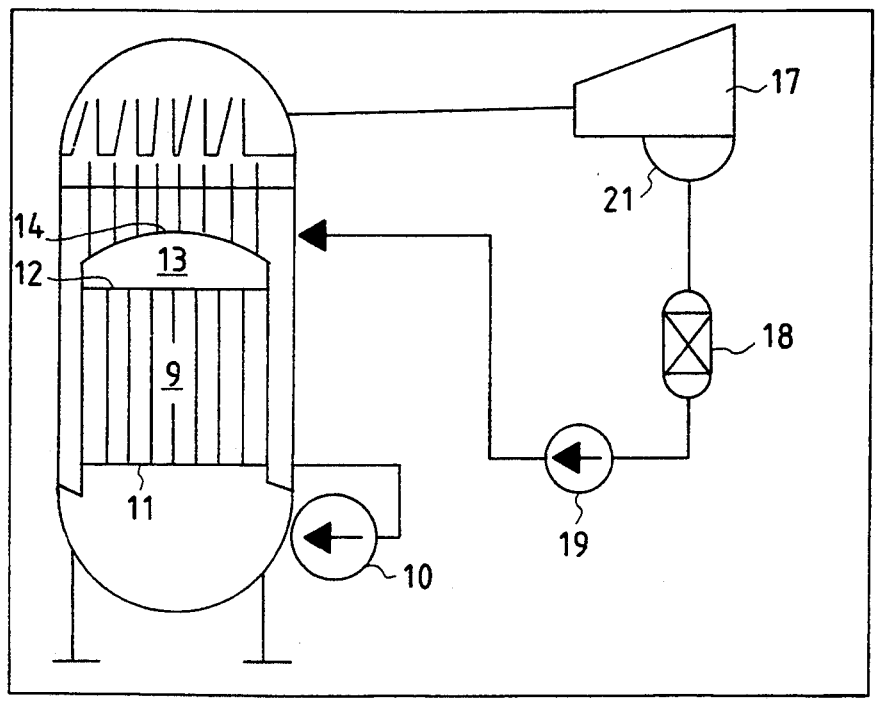
FIG. 7 is a schematic view of a boiling water reactor.
Figure 6:
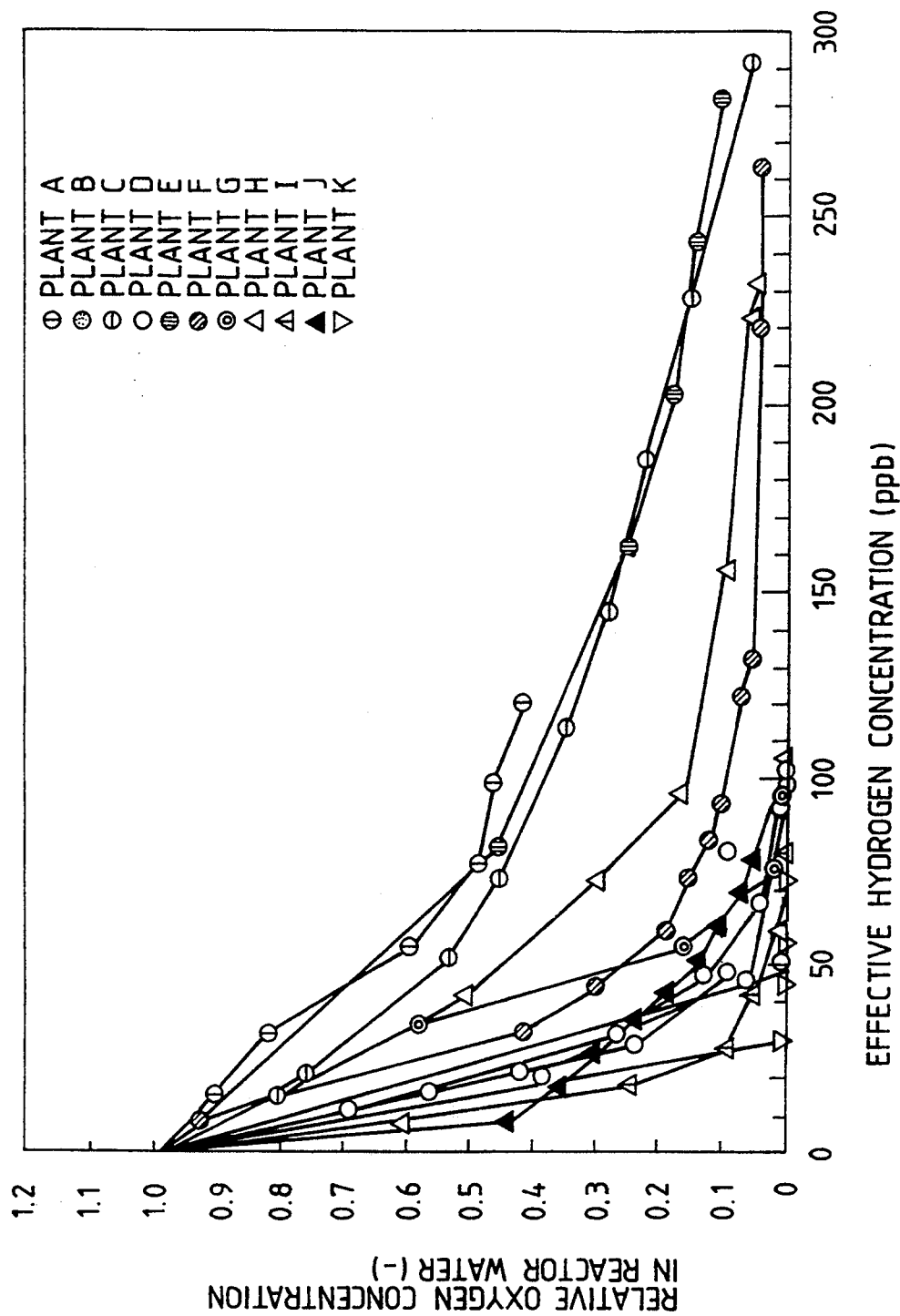
FIG. 6 is a diagram showing measured values of dissolved oxygens in a reactor water at a time of hydrogen injection.
Figure 8A:
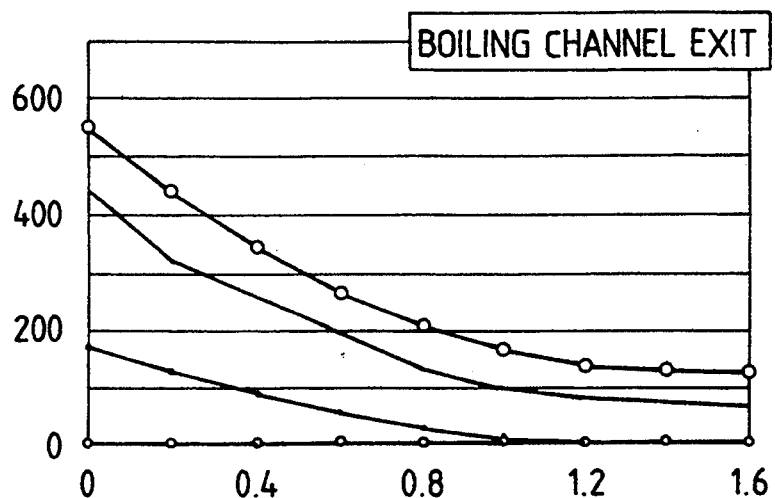
FIGS. 8a to 8c are graphs showing calculation results of water chemistry of reactor water at the boiling channel outlet, at the by-pass channel outlet, and at the core inlet, respectively.
Figure 8B:
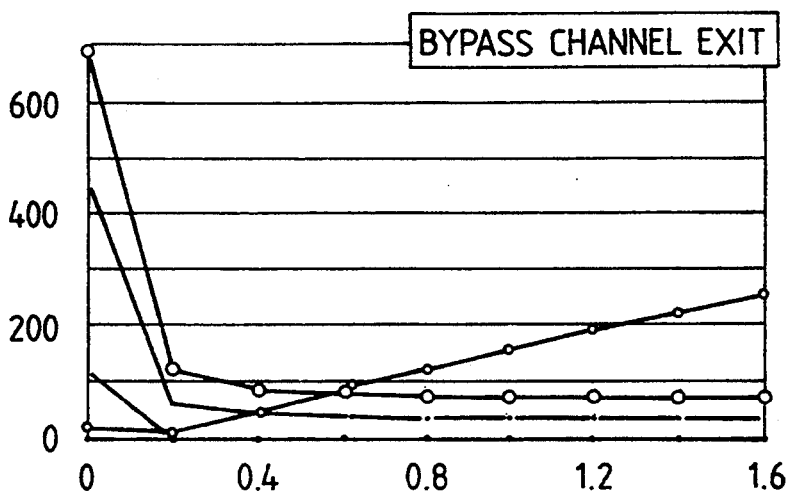
Figure 8C:
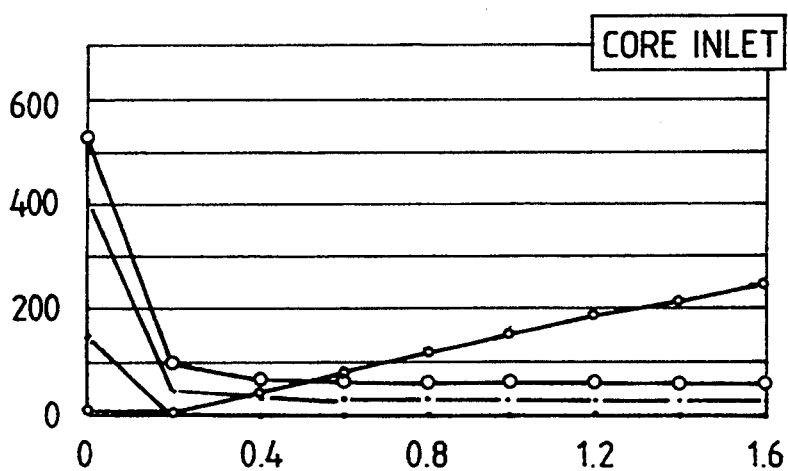
Figure 9A:
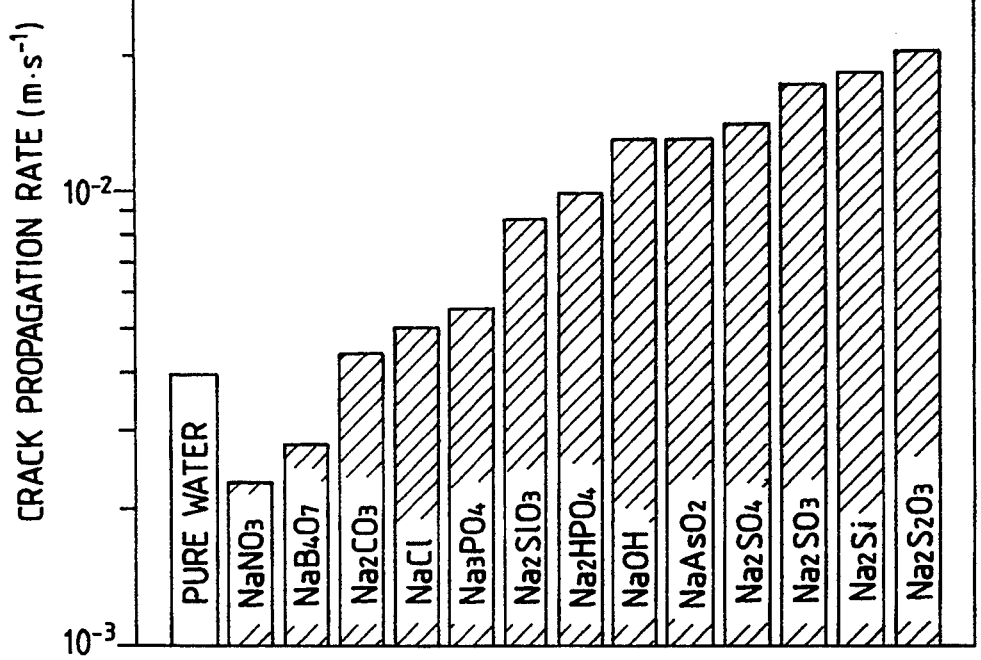
FIGS. 9i a and 9beach are a graph showing influence of added impurities on crack propagation rate of SUS 304 steel in high temperature water.
Figure 9B:
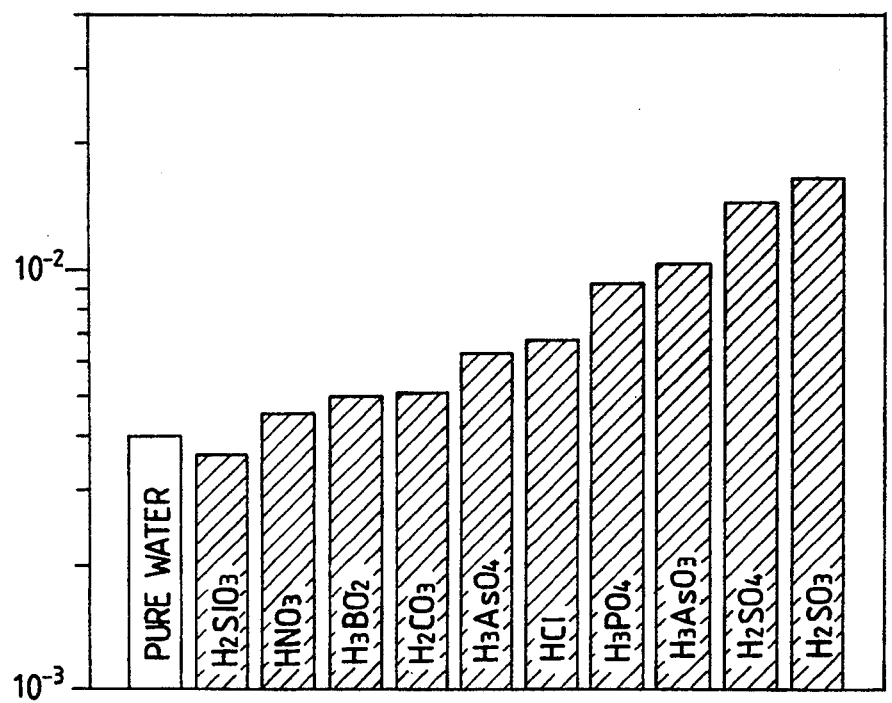
Figure 10:
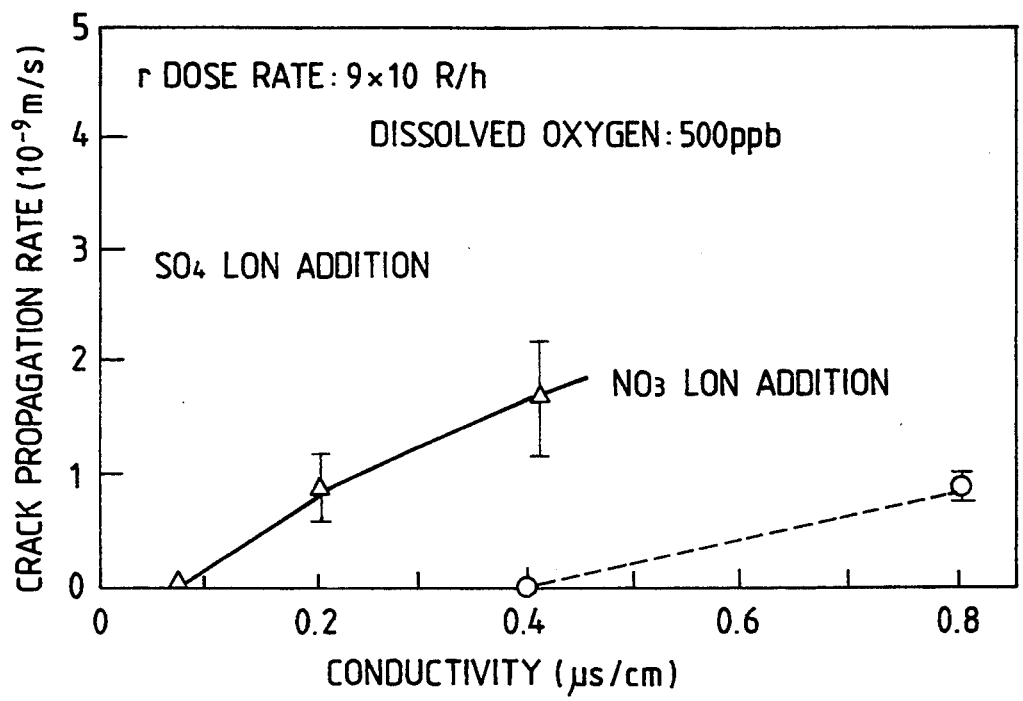
FIG. 10 is a graph showing difference in crack propagation rate of SUS 304 steel under gumma ray irradiation due to kinds of added impurities.
Figure 11:
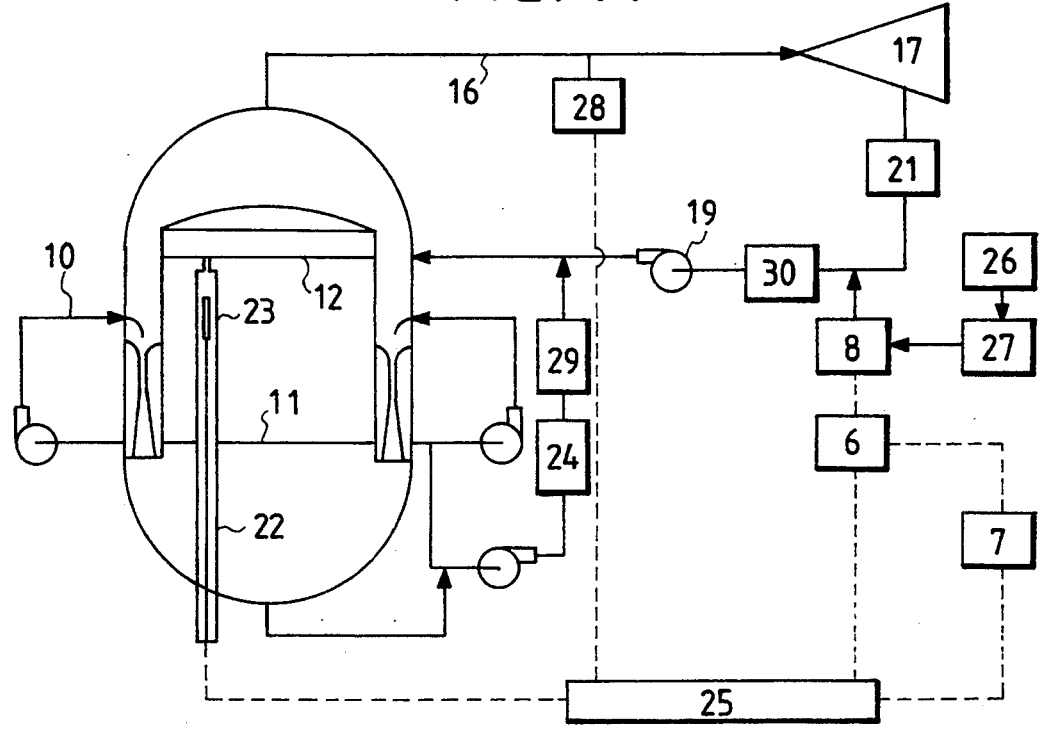
FIG. 11 is a block diagram showing an arrangement of sensor groups of an embodiment of the present invention.

An example of the arrangement of the sensors for control by synthetic sensor groups is illustrated in FIG. 11.

In FIG. 11, in a reactor pressure vessel, a small sized sensor group 23 is arranged in a core by-pass channel using a neutron measuring instrument pipe or LPRM pipe 22, for example. Outside the reactor, other sensor groups such as a main steam line sensor group 28, a reactor water clean-up sensor group 29, a feed water line sensor group 30 are arranged in a portion of a recirculation line 10 having a reactor water clean-up system 24, a main steam line 16, etc. for instance. An agent for mitigating corrosion damage, for example, hydrogens are produced in a hydrogen producing apparatus 26 and stored in a hydrogen storage tank 27. Outputs of the sensor groups 23, 28, 29, 30 are taken in an arithmetic unit 6 through an interface 25. A reference number 21 designates a condenser connected to a steam turbine 17, and a reference number 19 is a feed pump.

The sensors 23 in the core can be disposed at any positions thereof, however, the position of a lower lattice plate 11 which is difficult to exchange and disposed to a relatively severe water chemistry environment or an upper lattice plate 12 which is representative of the most severe environment to corrosion damage is preferable. In this embodiment, a crack propagation rate measured by a DCB sensor provided at a core inlet portion 12 of the upper lattice plate is taken as a standard target. As sensors provided simultaneously, an electro-chemical potential meter, potential meter of Pt group electrode, a conductivity meter, etc. are preferable.

In case any abnormality appears in the values indicated by the crack propagation monitor, and when it is an error signal, the possibility that it may be caused by mechanical damage or insulation damage is high, so that it should be considered that reliability of signals from sensors contained in the same sensor group is low. In this case, in order to evaluate whether or not the abnormal value is true, information from the sensor group 28 of the main steam line used stand-alone sensors until now and the sensor group of the recirculation line 10 is introduced into the arithmetic unit 6, wherein a sensor, which is changeable if the signal from the standard sensor is correct, is selected from knowledge information stored in the data base 7 and monitoring of these sensors is strengthened. In case change as forecasted really appears or in case any contradiction is not appear between outputs of the sensors which are obtained by extending a normal plant process monitoring range, sensor outputs of the standard sensor group can be taken to be true, so that information from the standard sensor group and other sensor group is put together to estimated a cause thereof and an amount of hydrogens to be injected is incremented or decremented if necessary.

In this case, as will be described later in an item (1), a margin of the concentration of hydrogens until dose rate of main steam starts to increase is evaluated from a component N in the main steam, whether the concentration of hydrogens to be injected should be incremented or decremented within this range of the margin is decided. Further, although it is not illustrated, since the state of reducing agent changes in reactor water by reaction with water decomposition products, in some cases an amount of injection thereof is desirable to measure at an injection point of the feed water line, if possible, in a stage before mixing with primary cooling water.

In case reliability of measured values of the standard target is low, the sensor group 29 provided in the recirculation line 10, for instance, becomes a plant process monitoring sensor group for always monitoring the plant process. As the sensor, a crack propagation monitor, an ECP meter, the conductivity sensor, a Pt potential meter (described later in item (2)), a pH meter, a chromic acid meter (described later in item (3)) by such as an ion chromato, etc., carboxylic acid concentration meter described later in item (4) are suitable.

Figure 12:
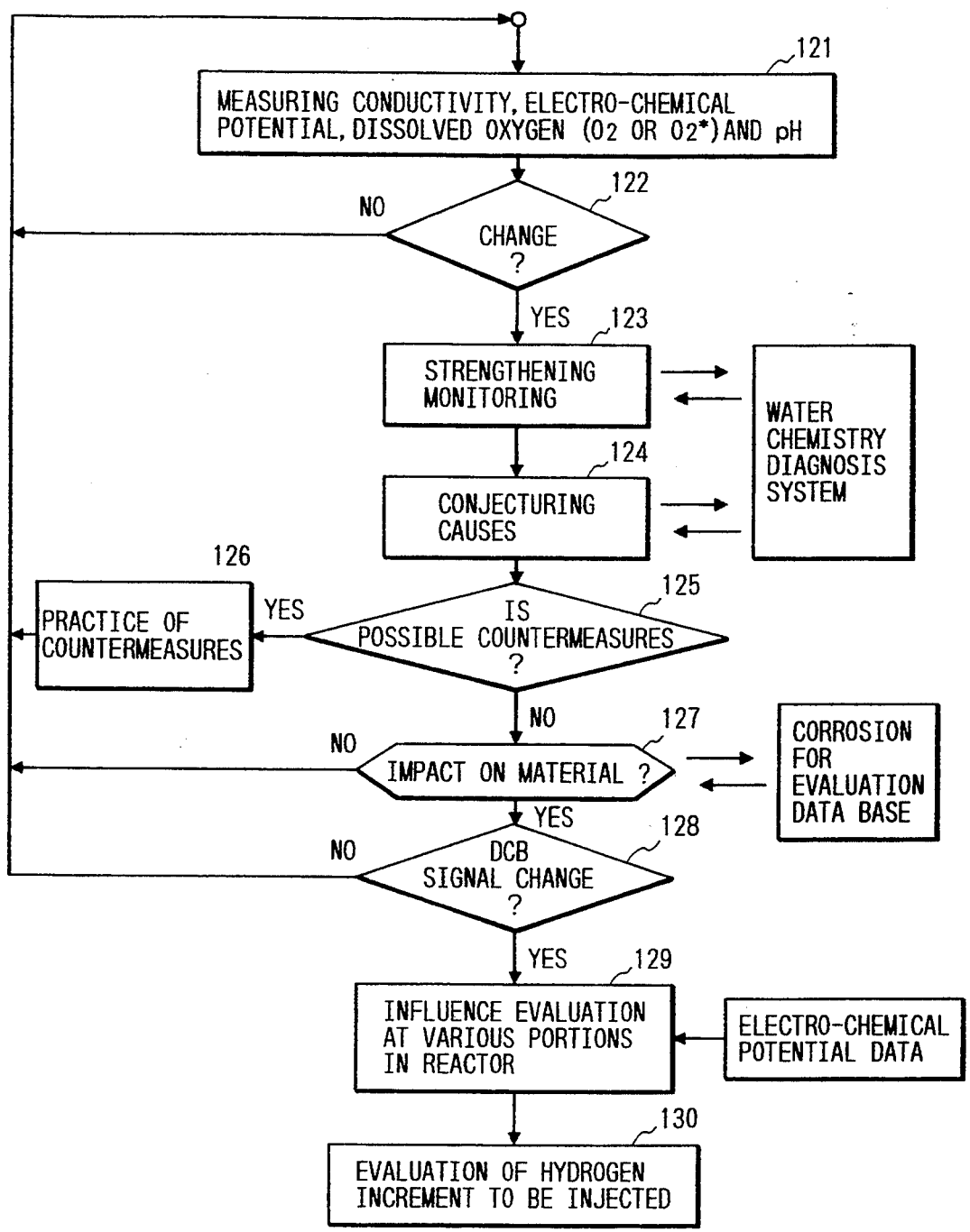
FIG. 12 is a flow chart of a typical example of a control logic in the invention.

FIG. 12 shows a logic flow of the water chemistry control in the above-mentioned system. In this system, in case change appears only in the ECP and the Pt potential meter, but no change in the other sensors, there may be the possibility that the concentration of oxygens or hydrogen peroxides in the reactor water increases. Further, when conductivity increases and pH turns to an acid side, it is estimated by various factors that sulfuric acid, nitric acid, carboxylic acid, etc. are formed in the reactor water. When the nitric acid is mixed in the reactor water, it is forecasted that any change appears in output of the standard sensor, so that monitoring of the standard sensor is strengthened. Those are in steps 121 to 123. Under these conditions, if any change in the standard sensor appears, output of the standard sensor can be considered to be sufficiently reliable, so that the cause is estimated in step 124 and any countermeasures for the water chemistry can be taken if necessary in steps 125, 126. If the change in output of the standard sensor Group is forecasted to impact the structural material (step 127), it is examined that there is any change in the DCB sensor in step 128. In steps 129, 130, influence evaluation at various points of the reactor is effected, and hydrogen injection amount change is evaluated. The water chemistry is controlled according to the estimation.

(B) In case of water chemistry control on the basis of estimated values:

In case immeasurable estimation values are taken as a standard target, a sensor Group for always monitoring are taken or selected from sensors provided in a plurality of lines. The standard target is estimated by outputs from the sensors of these lines.

The estimating method is as follow:

Water chemistry analysis results according to various injection amounts of hydrogens for each power plant are stored in the data base for each part of each primary cooling system. Let assume that a standard target is the concentration of hydrogen peroxides at the bottom of the core, for example. This hydrogen peroxide concentration here is immeasurable by present technique.

Let assume that the plant process monitoring sensor group is the water chemistry sensor group 29 provided in the recirculation line out of the core shown in FIG. 11. Effective oxygen concentration $O_2^*$ at a measuring point can be attained by measuring individually $O_2$, $H_2O_2$ or by outputs from the Pt potential meter, the EPC on SUS 304 steel.

Calculated values of $O_2^*$ concentration in the recirculation line stored in the data base 7 are not necessarily agreed with a value which is an indication for hydrogen injection amount. This is for the reason that the calculation results depends largely on plant constant (does rate distribution etc.) which is not necessarily correctly evaluated.

Figure 13:
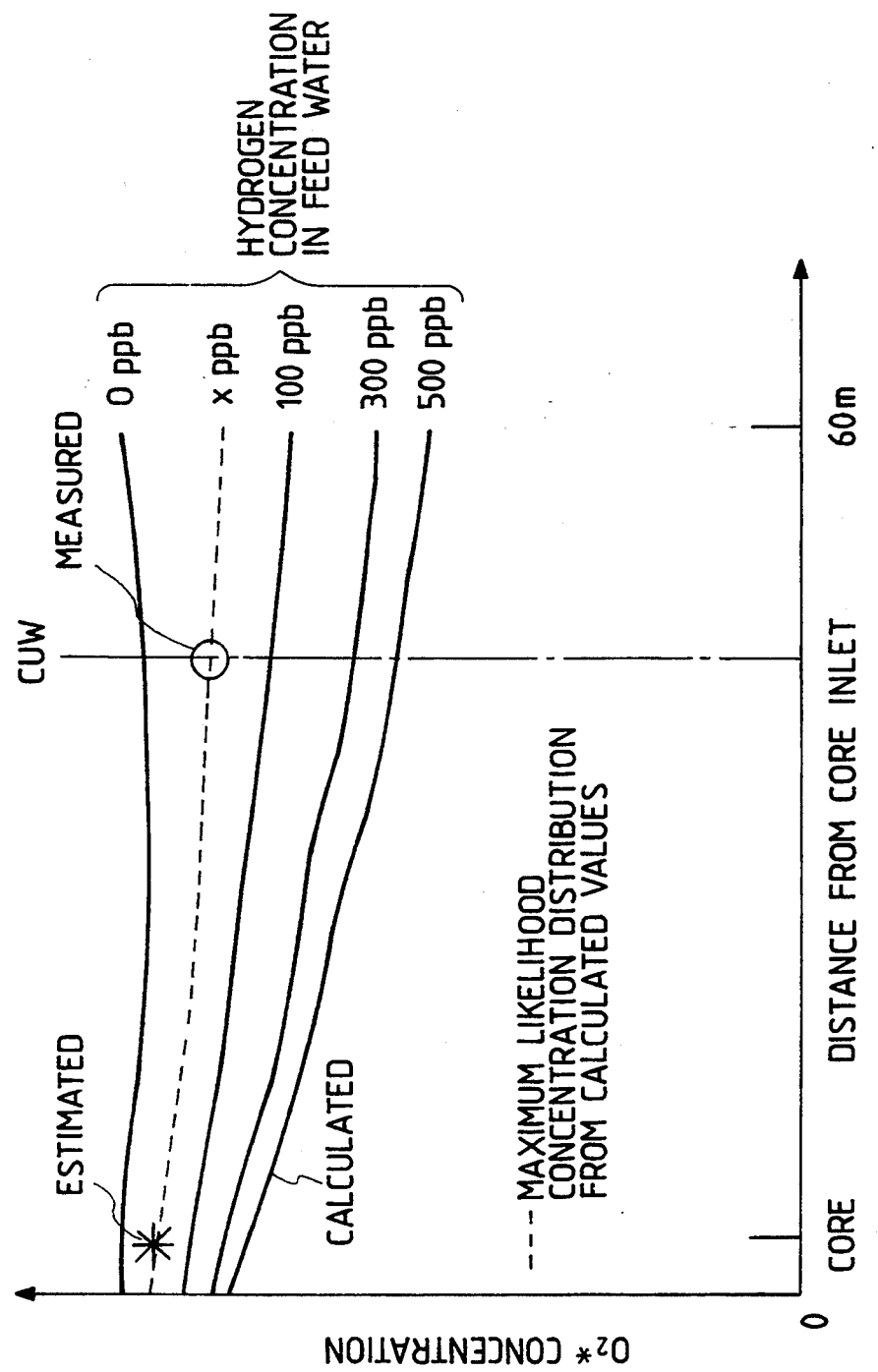
FIG. 13 is an explanation graph for estimating water chemistry in the reactor water from a measured value of water chemistry out of the core.

However, if the concentration at a specific portion of the primary cooling system is already known, correlation between these results and calculation results of water chemistry at other portion is relatively reliable. As shown in FIG. 13, analytical solutions agreed with oxidation components at the measured point such as $O_2$, $H_2O_2$ or $O_2^*$ are found out from the data base, and the concentration distribution including the analytical solutions is taken as a correct concentration distribution. In this case it is important point of the invention that compatibility between measured value and calculated value of concentration for reducing substance such as hydrogen is ignored, whereby logic of water chemistry control which has been proposed can be simplified drastically. If there is not any solutions concerning oxidation components, strictly accorded with required values, a distribution can be attained by an interpolation method. A representative value is decided by a method of average, election of larger value, for example, further, a part of contribution of $H_2O_2$ to $O_2^*$ is obtained from the calculation result by a proportional distribution, a value obtained thus is a estimated value of hydrogen peroxide in the core bottom.

An amount of hydrogen injection is adjusted so that this value will be a set value.

Figure 14:
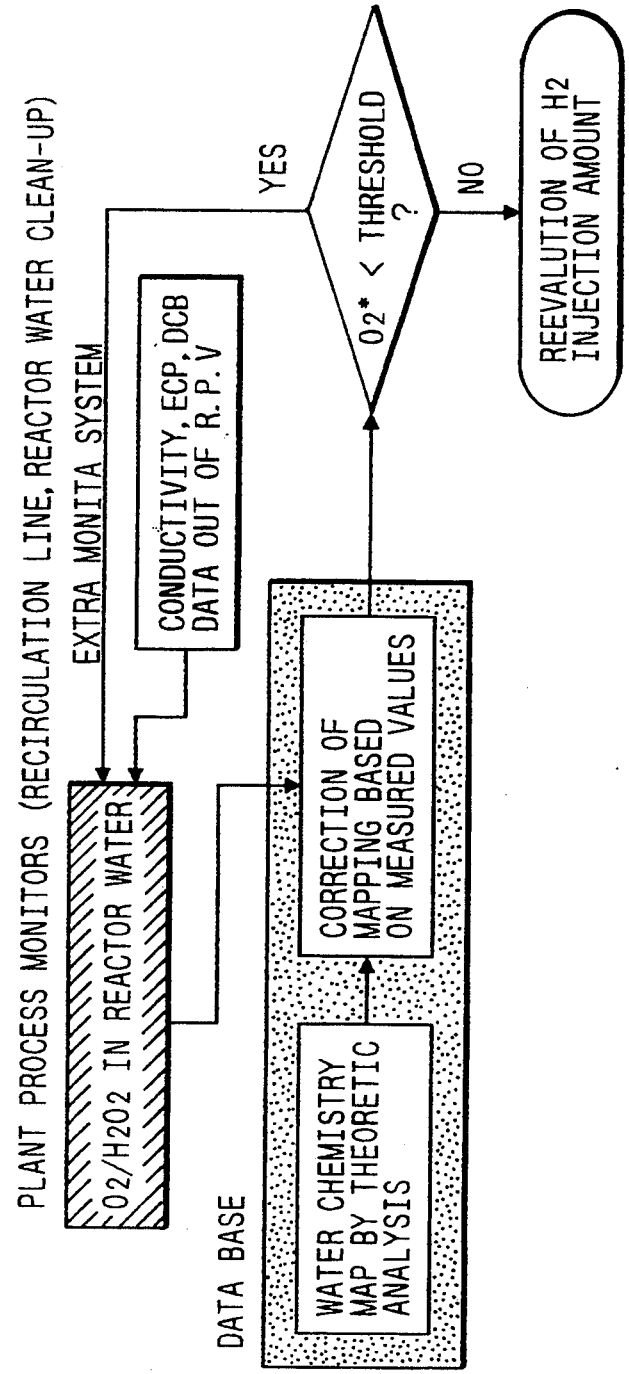
FIG. 14 is a flow chart for estimating water chemistry in the core from a measured value of the water chemistry out of the core.

A control flow chart is shown in FIG. 14.

Further, when the standard target is electrochemical potential and crack propagation rate (da/dt) of material at a position at which measurement is impossible, the EPC and sensibility evaluation concerning da/dt are obtained on the basis of calculation based on plant information representative of the following 4 items and data base resembled to a real machine;

a) kinds of structural material;
b) flow rate at a noticed point;
c) $\gamma$ ray intensity at a noticed point; and
d) neutron intensity at a noticed point.

Here, the kinds of structural material of the above 4 items include data in which over-voltage in electron-transfer reaction of water decomposition products on the material surface and sensibility concerning crack propagation are main. The flow rate includes data relating to compensation rate of oxidation reduction species and dispersion layers. The $\gamma$ ray intensity includes data concerning kinds and concentrations of water decomposition products. The neutron intensity includes data concerning material properties in which data of sensitization of structural material are main.

A fundamental logic of the electro-chemical potential meter is a hybrid potential theory on the basis of electro-chemical reaction of water decomposition products on the structural material surface. This theory is based on cell reaction in which at least 2 kinds of oxidation and reduction reactions are paired, and it is the theory that potential at which each oxidation reaction rate and each reduction reaction rate become equal to each other is potential of the entire system, that is, hybrid potential, and kinetic handling is necessary.

The kinetics is based on the handling in which the following absolute reaction velocity equation concerning the simplest electron transfer reaction is fundamental. Namely it is based on reaction of oxygen reduction pair on a structural surface.

$$X = Y + ne$$

$$i = i_0[(Cx/Cx^0)\exp(\alpha nF\eta/RT) - (Cy/Cy^0)\exp(-(1-\alpha)nF\eta/RT)] \quad (1)$$

wherein i is current density representative of electron transfer velocity on a structural material surface, $i_0$ is exchange current density on the structural material, Cx is the concentration of reaction species X of structural material surface, $Cx^0$ is the bulk concentration of X, $\alpha$ is transition coefficient to oxidation direction n is reaction electron number, F is Faraday's constant, $\theta$ is over-voltage, R is a constant of gas, T is absolute temperature, Cy is the concentration of reaction species Y, and $Cy^0$ is bulk concentration of Y.

Here, $\eta$ is as follows:

$$\eta = E - E_0,$$

wherein E is potential of the structural material when electron transfer reaction velocity is measured with current density i, and $E_0$ is balanced potential. The over-voltage $\eta$ has different values according to kinds of structural material even if the same reaction species are taken, its measurement is effected in advance in an experimental room, experimental furnace. Here the same handling on paired oxidation reduction reactions is taken fundamentally, potential E at which each current density representative of each electron transfer reaction velocity is equal is obtained. This common potential E is potential at which velocity in the oxidation direction and in the reduction in a so-called paired oxidation reduction system becomes equal, the is hybrid potential. $Cx/Cx^0$, $Cy/Cy^0$ are expressed by the following equation, $$Cx/Cx^0 = 1 - i/i^+ \quad (2)$$

wherein $i^+$ is limit current concerning oxidation direction of the reaction equation (1).

$$Cy/Cy^0 = 1 - i/i^- \quad (3)$$

wherein $i-$ is limit current concerning reduction direction of the reaction equation (1).

Limit current density relating to oxidation direction and reduction direction includes diffusion coefficient, diffusion layer thickness of each reaction species and information of flow rate relates to limit current, that is, to a feed rate of reaction substances on boundary of structural material.

Thus values are parameters to be experimentally determined in a advance on the basis of values of $Cx^0$, $Cy^0$ obtained by calculation of water decomposition products. By the process of obtaining this hybrid potential, electro-chemical potential of structural material disposed to each environment can be mapped. An evaluation method of crack propagation sensitivity of structural material at a position where a crack sensor can not be installed is to estimate on the basis of values of which in situ data of a DCB sensor can not be obtained, on the basis of the electro-chemical potential obtained by the above-mentioned steps, neutron irradiation amount and sensitivity corresponding to the neutron irradiation amount, flow rate at a noticed point $\gamma$ rays intensity.

Figure 15:
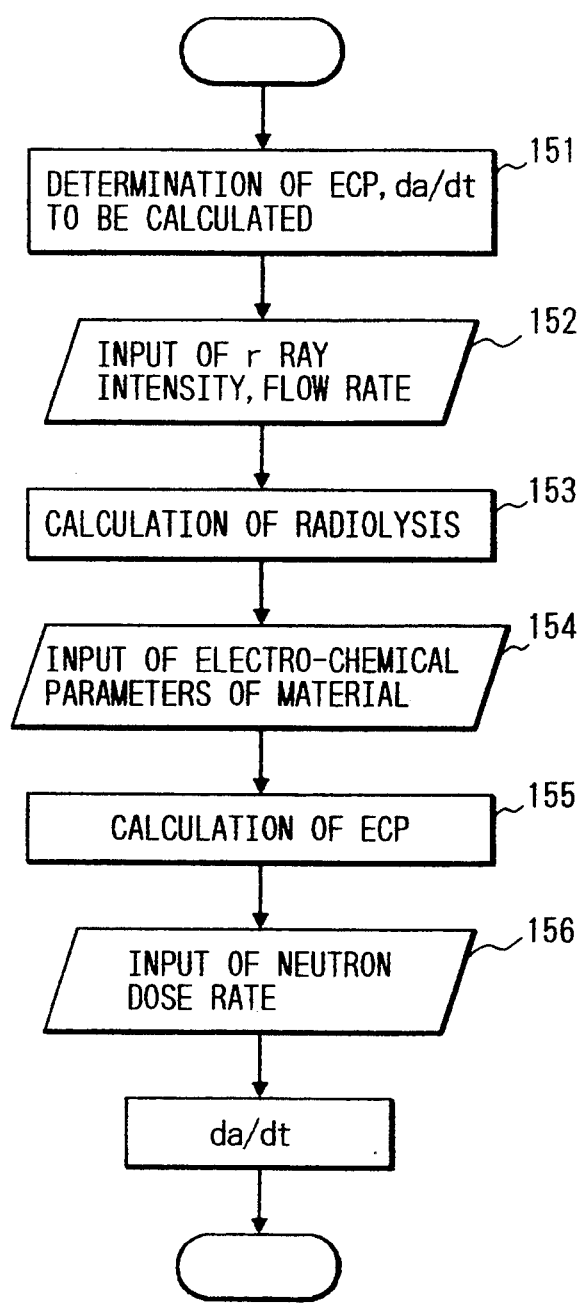
FIG. 15 is a flow chart showing an algorithm for calculation of electro-chemical potential at a immeasurable position and estimating da/dt.

FIG. 15 shows algorithm for estimating the electro-chemical potential and the stress corrosion cracking sensibility (da/dt) at positions where measurement can not be effected.

In step 151, the ECP, da/dt to be calculated are determined. The concentration of radiolysis products is calculated on the basis of $\gamma$ ray intensity, flow rate, etc. in steps 152, 153. Over-voltage, transition coefficient, each diffusion coefficient, reaction electron numbers until it reaches to controlled velocity, reaction electron numbers of the entire reaction, electrode reaction velocity constant, diffusion layer thickness, etc. in an electrochemical reaction concerning oxygens, hydrogen peroxides of noticed material are inserted in hybrid potential calculation code on the basis of the absolute reaction velocity equation concerning electrode reactions, set in advance, whereby the electro-chemical potential is obtained in steps 154, 155. da/dt is estimated on the basis of the obtained electro-chemical potential and a data base of experimental room experimental furnace using the sensibility of material by neutron irradiation, radiolysis product concentration, and conductivity of the core water in step 156.

Figure 16:
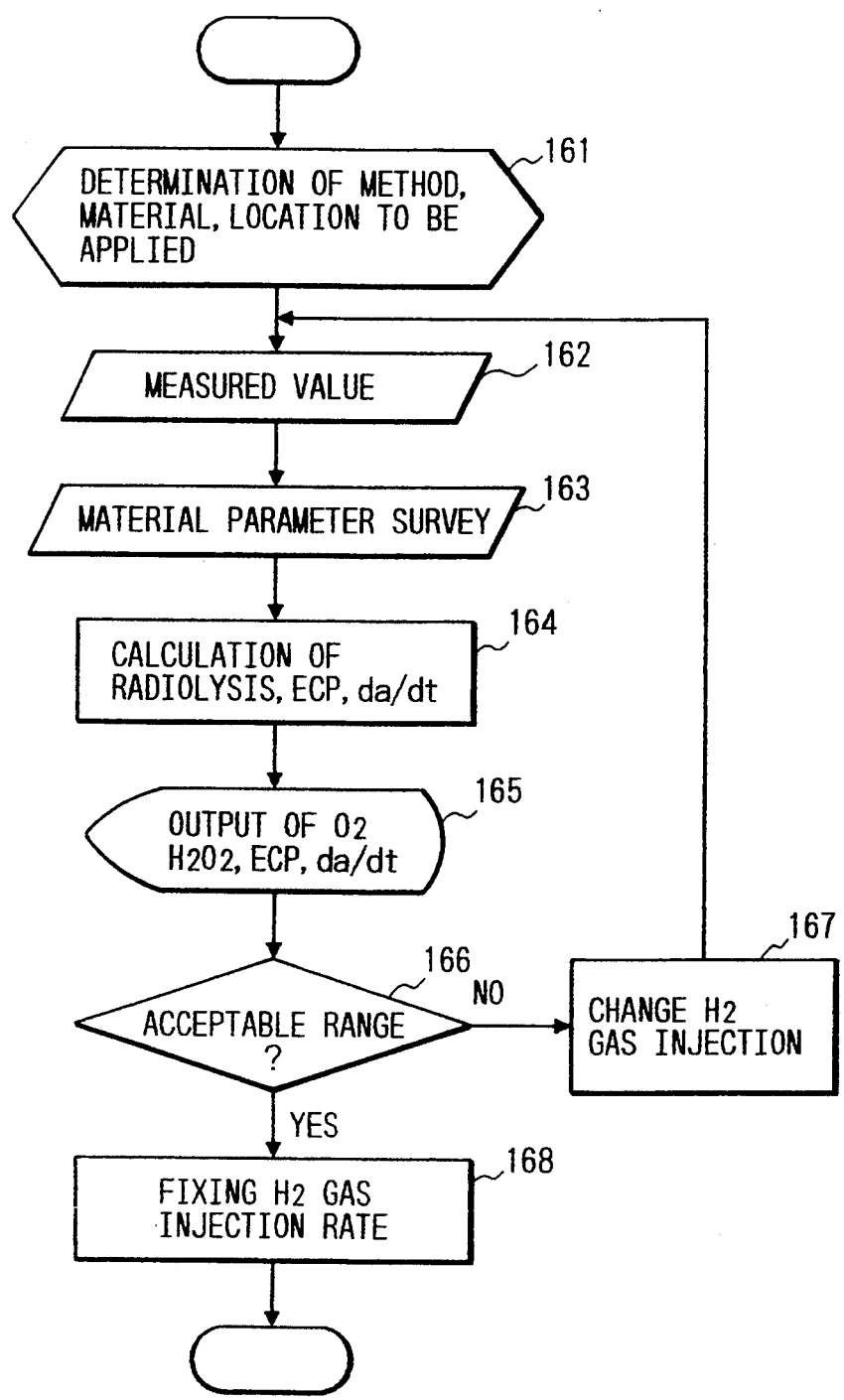
FIG. 16 is a flow chart for mitigating an corrosion environment by injection of hydrogens.

FIG. 16 shows a flow chart in case a portion to be protected in the core at which measurement and monitoring can not be effected is protected by injection of hydrogens, using material/environment parameters obtained on the basis of the algorithm shown in FIG. 15.

In FIG. 16, first of all, an objective portion is set in step 161, and then measured data from the sensors, the concentration of water decomposition, electro-chemical potential and parameters necessary to obtain da/dt are inputted in a step 162, 163, whereby dissolved oxygen concentration, peroxide concentration, electro-chemical potential, da/dt, at the objective portion are estimated in step 164 and outputted or displayed in step 165. When the estimated value such as da/dt is acceptable compared with a standard value in step 166, a hydrogen injection rate is fixed as it is in step 168, and when it is not acceptable in step 166, the hydrogen injection rate is changed until each of the values satisfy the standard value in step 167.

New element techniques supporting the invention are explained hereunder.

(1) Control on the basis of chemical state of radioactive nitrogen in the main steam:

The chemical state of radioactive nitrogen influences corrosion environment of a core and decides ratio of anions cations and neutral substances. When hydrogens which are used in many cases as an agent for mitigating corrosion damage are injected, it is known that dose rate of a turbine system rises by an increase in $^{13}N$ in the main steam. Although the increase in $^{13}N$ in the main steam occurs by various causes, its sign can be known by ratio of anions, cations and neutral substances in $^{13}N$ in the main steam.

Figure 17:
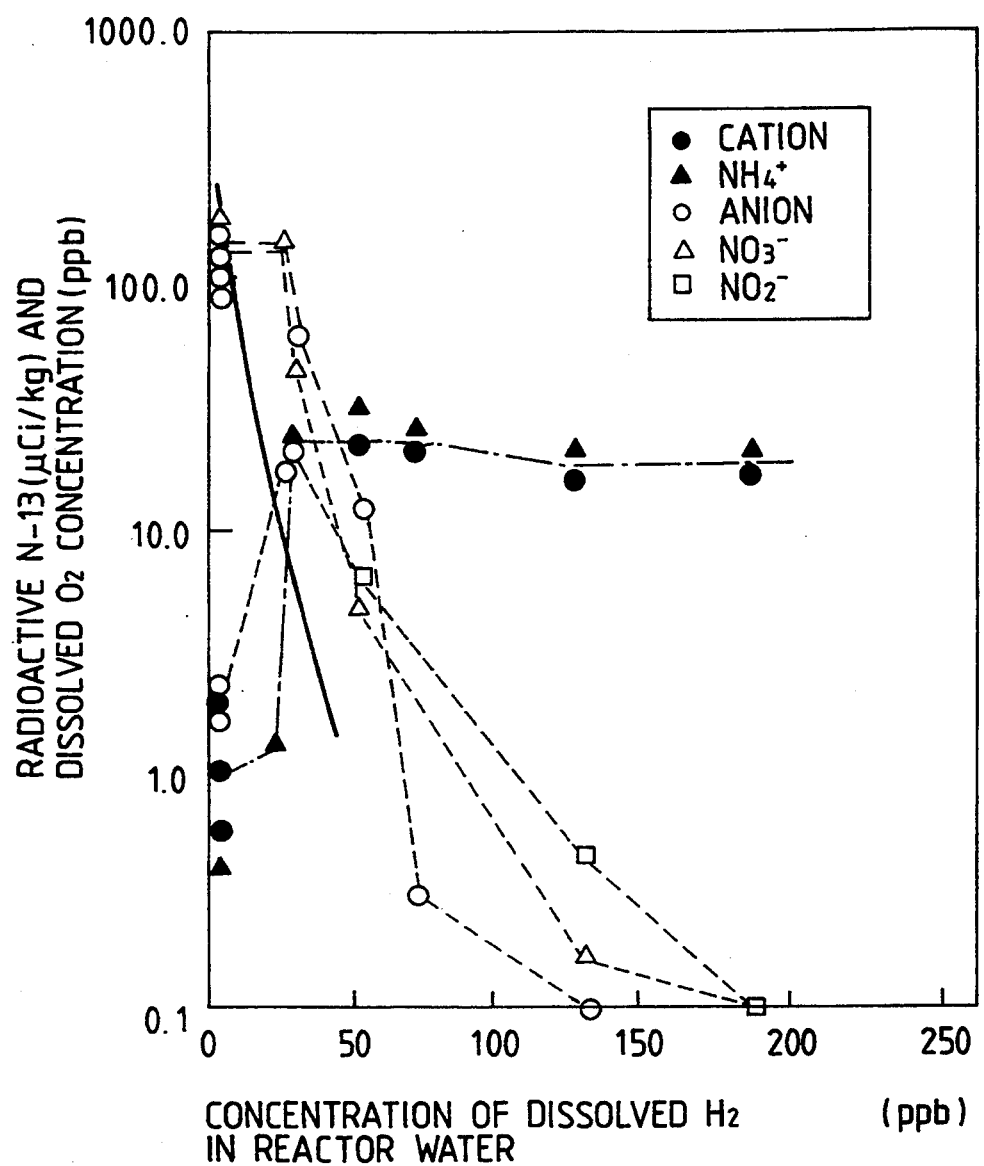
FIG. 17 is a graph showing change in chemical state of $^{13}N$ in the main steam at a time of injection of hydrogens.
Figure 18:
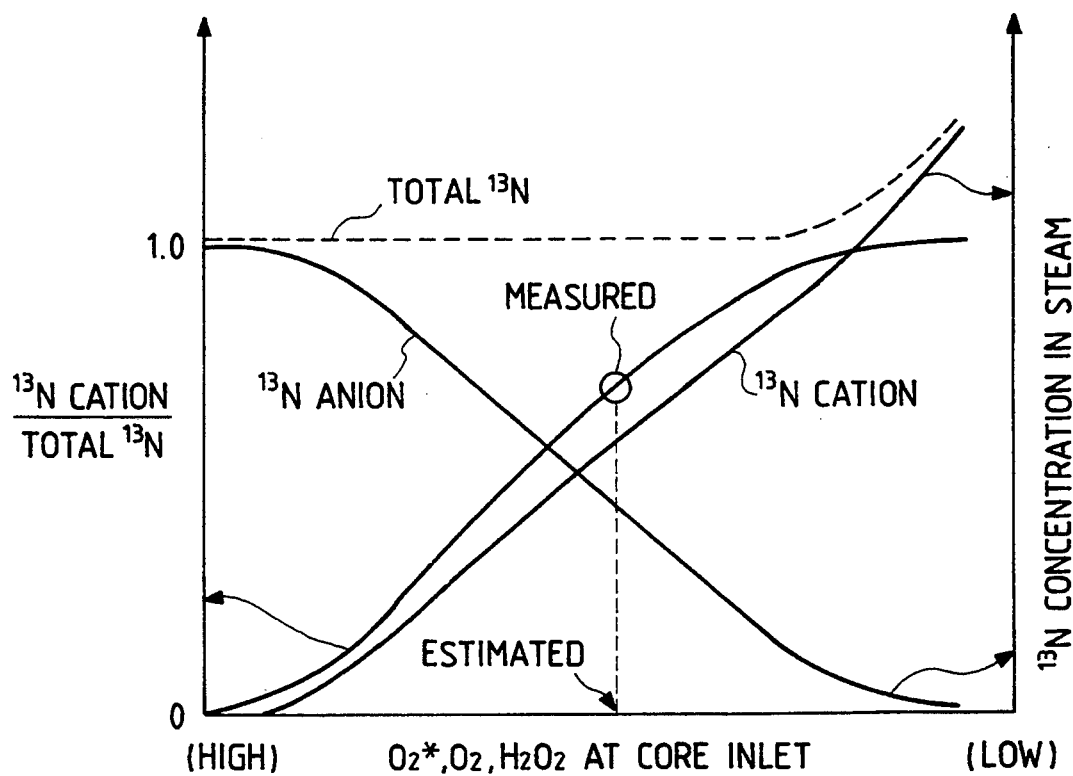
FIG. 18 is a graph for explaining a estimating method of water chemistry at the core inlet from the contents of $^{13}N$ in the main steam.

As shown in FIG. 17, a specific component of $^{13}N$ such as nitrous acid increases uniformly according to an increase of hydrogens, changes to cations at a certain concentration, and from here dose rate of the main steam also starts to increase. Accordingly, by always monitoring an absolute quantity of the component or a relative relation to other components, a margin of an hydrogen injection amount within which the dose rate of the main steam does not increase can be estimated. Further, as shown in FIG. 18, by measuring a specific ratio of $^{13}N$ components (cation $^{13}N$/total $^{13}N$ in the figure), calculation conditions satisfying the ratio can be adapted as a estimated value of water environment at a core inlet.

(2) Control on the basis of potential of inert metal:

For ECP, electrode reaction accompanying solution and precipitation is included, however, since electrode potential of Pt etc. corresponds to only dissolved components in the water, the electrode potential influences mainly the concentrations of hydrogens and hydrogen peroxides.

(3) The concentration of Cr ions in core water change according to a water chemistry environment (mainly an oxidations reduction environment). Namely, when any agent for mitigating corrosion damage is not injected, Cr is dissolved in the core water in a form of oxide ion. When hydrogens, that is, the agents for mitigating corrosion damage are injected, Cr changes in form of undissolved oxide. It is known that the concentration decreases in a real plant also, as shown in the following table, in which water chemistry data in Ringhals-1 reactor at a hydrogen injection test are listed-as follows:

| Test No. | $O_2$ (ppb) | $H_2$ (ppb) | $H_2O_2$ (ppb) | Cr (ppb) | Conductivity $\eta$ s·cm$^{-1}$ (25° C.) | Reactor power % |
|---|---|---|---|---|---|---|
| Water quality before test | 320–340 | 14–10 | <2 | 0.6–0.8 | 0.14–0.20 | 100 |
| Water quality after test | 330–400 | 16–19 | <1 | max 64 | 0.23–0.46 | 100 |
| 8 | 16–31 | 27–40 | <1 | 0.3–0.7 | 0.14–0.16 | 100 |
| 14 | 3–5 | 20–23 | — | 5.–10. | 0.15–0.22 | 50 |
| 13 | 2–23 | 20–90 | — | — | 0.10–0.33 | 65–100 |
| 10 | 7–12 | 45–60 | <1 | <0.1 | 0.11–0.14 | 100 |
| 16 | 8–11 | 100–110 | <1 | 0.1–0.2 | 0.09–0.10 | 100 |
| 12 | 2–6 | 60–80 | — | 0.1–0.3 | 0.10–0.15 | 100 |
| 15 | 3–9 | 50–170 | <2 | 0.0–0.1 | 0.08–0.09 | 100 |
| 9 | 1–6 | 50–75 | <1 | 0.0–0.3 | 0.11–0.12 | 100 |

Further, when the hydrogen injection is stopped, there appears the change that Cr ion concentration increases more than before the hydrogen injection at approximately the same time as the dissolved oxygen concentration increases. Accordingly, at the stage in which an amount of hydrogen injection is determined from dissolved oxygen concentration, crack propagation rate, Cr ion concentration in the core water is sensed under the hydrogen injecting condition and a standard target is set by adding a correction value corresponding to a measurement error to the sensed value. After the standard target is set, the Cr ion concentration in the core water is monitored referring to the value, and when the concentration goes out of the value, the agent for mitigating corrosion damage is adjusted so that the concentration will be within the standard value.

Figure 19:
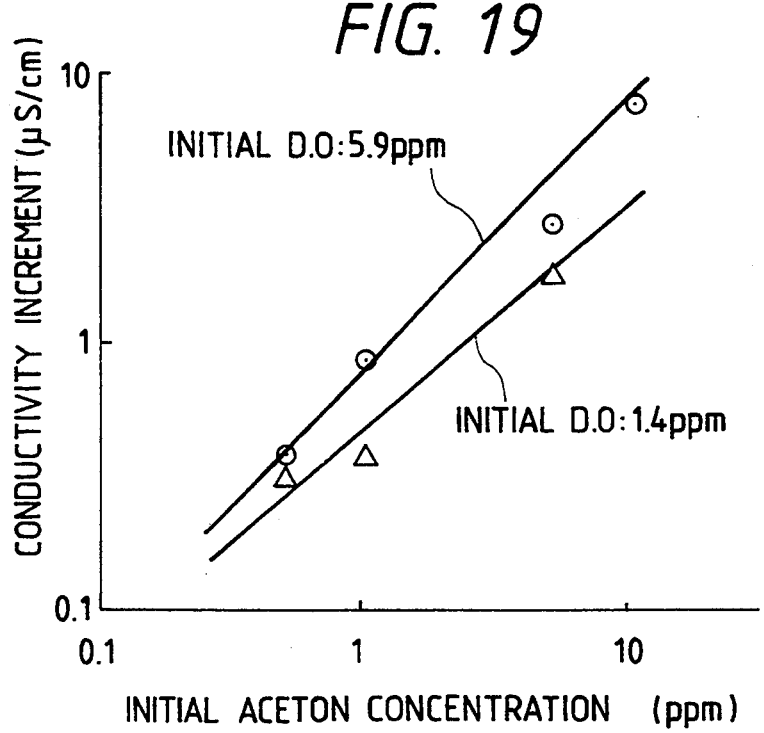
FIG. 19 is a graph showing the change in conductivity at a time of gumma ray irradiation

(4) Organic carbon flowed into the reactor is caused to effect decomposition reaction by a radiation field in the core, whereby its chemical state is changed. For example, in case water solution including acetone is irradiated by $\gamma$ ray, carboxylic acid such as acetic acid, formic acid is produced, so that pH lowers and the conductivity rises. Although organic substance decomposition products may be considered to be alcohols, it changes to carboxylic acid through aldehyde having oxidation substance such as hydrogen peroxide. Namely, an amount of carboxylic acid produced according to an environment of water changes an amount of change in conductivity seems to change. Water solution including acetone is irradiated with $\gamma$ ray, with dissolved oxygen concentration before irradiation being changed. Result as shown in FIG. 19 are obtained. From FIG. 19, it is noted that ratio between change in the conductivity and change in an amount of acetone changes according to initial dissolved oxygen concentration. The initial dissolved oxygen concentration influences product concentration of hydrogen peroxide, so that it meant that water chemistry environment during irradiation changes and low dissolved oxygen concentration mitigates oxidation environment. Therefore, by monitoring ratio between carboxylic acid concentration and TOC in the core water, water chemistry environment can be estimated. Accordingly, at the stage where a suitable amount of agent for mitigating corrosion damage is decided from the dissolved oxygen concentration, crack propagation rate, etc., a standard value of ratio between carboxylic acid and TOC under hydrogen injection condition is set. After setting the standard value, the agent injection is adjusted so that the ratio between the carboxylic acid concentration and TOC in the core water will be within the range of the standard value. This method has an effect that injection control reliability is increased by directly monitoring TOC and making it into a control target since TOC becomes a factor changing water environment in a plant in which TOC is high.

In the above embodiment, direct measuring of carboxylic acid is based on premise, however, using other impurity ion concentration and conductivity, pH value, unknown carboxylic acid concentration can be estimated by using simultaneous equations concerning electrical neutralization conditions and dissociation equilibrium of carboxylic acid. When such estimated value is used, preciseness lowers but when the carboxylic acid concentration is low and can not be directly measured, the method is effective.

As explained above, according to the invention, precise measurement of reactor water chemistry is possible while covering error factors in individual sensor. Even if new sensors are used, it is unnecessary to change largely control logic and suitable water chemistry control conditions under various conditions can be decided clearly and the reactor water chemistry can be kept proper.

What is claimed is:

1. A primary cooling system of a boiling water nuclear reactor, characterized by a water chemistry control system comprising:
    a plurality of water chemistry sensors provided in flow passages of water or steam of the primary cooling system at different portions, said primary cooling system including a main steam line, a feed water line and a condensate line;
    means for estimating a water chemistry at least one specific portion of said primary cooling system, using information from at least some of said plurality of water chemistry sensors, said means including an arithmetic unit and a memory device; and
    at least one injection device for injecting an agent for improvement of the water to mitigate corrosion damage of said primary cooling system.

2. A primary cooling system of a boiling water nuclear reactor, characterized by comprising:
    means for sensing a physical quantity of a specific factor of factors determining a water chemistry around at least one first specific portion of the primary cooling system;
    means for estimating the water chemistry at at least one second specific portion of the primary cooling system different from said first specific portion on basis of the measured value and data base stored in a memory device; and
    means for injecting an agent for mitigating corrosion damage of structural material of the primary cooling system into the primary cooling system so that a conjectural value obtained by said estimating means will be within a target range.

3. A primary cooling system of a boiling water nuclear reactor, having
    means for storing in advance theoretical calculation results concerning the concentration of chemical components in water in the primary cooling system for each of various operational conditions in a memory device; and
    means for estimating, on the basis of the calculation results and measured values of some of the chemical components in the water or steam, a water chemistry at a portion of the primary cooling system different from measuring points.

4. A primary cooling system of a boiling water nuclear reactor according to claim 3, wherein a water control system is provided which determines increment or decrement of an agent for mitigation of corrosion damage to be injected on the basis of the estimated value of said water chemistry.

5. A primary cooling system of a boiling water nuclear reactor according to claim 3 or 4, wherein said chemical component in the water in the primary cooling system is at least one element selected from a group consisting of water decomposition products, organic carbides, chromic acids, and radioactive nitride.

6. A primary cooling system of a boiling water nuclear reactor according to claim 3, 4 or 5, wherein said storing means stores in advance calculation result of concentration distribution of the chemical components in the water in the primary cooling system, and said estimation value is concentration distribution including calculation value accorded with measured value, within a range of measuring error, of acidifying components at a specific portion.

7. A primary cooling system of a boiling water nuclear reactor according to claim 3, 4 or 5, wherein physical quantity to be estimated from the measured value of the chemical components in the water in the primary cooling system is at least one of an amount of hydrogens, an amount of peroxides and weighted arithmetic average of the amounts of the hydrogens and the peroxides.

8. A primary cooling system of a boiling water nuclear reactor according to claim 1, wherein said agent for mitigation of corrosion damage is at least one selected from a group consisting of reducing substance, alkaline metal, and alkaline metal compound.

9. A primary cooling system of a boiling water nuclear reactor according to claim 8, wherein said reducing substance is at least one selected from a group consisting of hydrogen, ammonium and hydrazine.

10. A primary cooling system of a boiling water nuclear reactor according to claim 8, wherein said alkaline metal is at least an element selected from Li, K, Cs and Na.

11. A primary cooling system of a boiling water nuclear reactor according to claim 1, wherein at least one of said water chemistry sensors is at least one of an electro-chemical potential meter, a potential meter of inert metal, a dissolved oxygen meter, a pH meter, a conductivity meter, an analyzer of components of radioactive nitrogen in the main steam line, a crack development monitor and a radiant ray dose rate meter in the main steam line.

12. A primary cooling system of a boiling water nuclear reactor according to claim 11, wherein said inert metal is at least an element selected from group consisting of Pt, Au and Pd.

13. A primary cooling system of a boiling water nuclear reactor, characterized by a water chemistry control system comprising:

a plurality of water chemistry sensors provided in flow passages of water or steam of the primary cooling system at different portions;

means for detecting or estimating a water chemistry at least one specific portion of said primary cooling system; and at least one injection device for injecting an agent for improvement of the water chemistry to mitigate corrosion damage of said primary cooling system.

14. A primary cooling system of a boiling water nuclear reactor according to claim 13, wherein said water chemistry control system is characterized in that the concentration of agent for mitigating corrosion damage is incremented or decremented according to a relative ratio between concentrations of anions, cations and neutralization components of nitrogen in the main steam.

15. A primary cooling system of a boiling water nuclear reactor according to claim 13, wherein a suitable value of the concentration of an agent for mitigating corrosion damage is determined according to the concentration or ratio of anions, cations and neutralization components of nitrogen 13 (N) in the main steam, and an upper limit of the concentration is determined depending on radiant ray dose rate around main steam pipings.

16. A primary cooling system of a boiling water nuclear reactor according to claim 13, wherein said water chemistry control system is characterized in that a lower limit of the concentration of an agent for mitigating corrosion damage is determined according to output of a crack propagation monitor submerged in the core water.

17. A primary cooling system of a boiling water nuclear reactor according to claim 13, wherein said water chemistry control system is characterized in that a lower limit of the concentration of an agent for mitigating corrosion damage is determined according to a measured value of concentration of sulfuric acid ions and copper ions in the core water.

18. A primary cooling system of a boiling water nuclear reactor according to claim 13, wherein said water chemistry control system is characterized in that the concentration of an agent for mitigating corrosion damage is incremented and decremented according to the chromium ion concentration in the reactor water.

19. A primary cooling system of a boiling water nuclear reactor according to claim 13, wherein said water chemistry control system is characterized in that the concentration of an agent for mitigating corrosion damage is incremented and decremented according to a ratio between the carbolic acid concentration and total organic carbide in the core water.

20. A primary cooling system of a boiling water nuclear reactor according to claim 13, wherein said water chemistry control system is characterized in that an injection amount of an agent for mitigating corrosion damage is adjusted so that a sum of an oxygen gas flow rate in the main steam and a bulk flow rate of injected oxygen gas in an off gas line will be more than half of a bulk flow rate of hydrogen in the main steam.

21. A water chemistry control method of a nuclear power plant, comprising the steps of:

measuring at least a physical quantity representative of water chemistry at a first portion of a primary cooling system of the nuclear power plant;

estimating a value representative of water chemistry at a second portion of said primary cooling system different from said first portion on the basis of a measures value in said measuring step and data stored in a memory device obtain a estimated value concerning the water chemistry around said second portion; and controlling the water chemistry around said second portion according to said estimated value.

22. A water chemistry control method of a nuclear power plant, comprising the steps of:

monitoring, on the basis of water chemistry information and radiolysis production concentration distribution around structural material at various portions of the primary cooling system and on the basis of flow rate distribution, dose rate distribution at the various portions of the primary cooling system, electro-chemical potential of the structural material under water chemistry conditions of each the portion of the primary cooling system in the reactor;

comparing the electro-chemical potential with a standard electro-chemical potential value set in advance; and controlling the water chemistry on the basis of the compared results.

23. A water chemistry control method of a nuclear power plant, comprising the steps of:

monitoring, on the basis of water chemistry information and radiolysis production concentration distribution around structural material at various portions of the primary cooling system and on the basis of flow rate distribution, dose rate distribution at the various portions of the primary cooling system, electro-chemical potential distribution and SCC sensibility distribution of the structural material under water chemistry conditions of each the portion of the primary cooling system in the reactor;

comparing monitored values with a standard electro-chemical potential value and a standard SCC sensibility value set in advance; and controlling the water chemistry on the basis of the compared results.

* * * * *